United States Patent

Barnett et al.

[15] 3,693,982

[45] Sept. 26, 1972

[54] REVERSIBLE TAPE TRANSPORT SYSTEM

[72] Inventors: Don C. Barnett, Columbus, Ind.; Kingston E. Ganske, Rough and Ready, Calif.

[73] Assignee: Arvin Industries, Inc., Columbus, Ind.

[22] Filed: Sept. 4, 1970

[21] Appl. No.: 69,546

Related U.S. Application Data

[62] Division of Ser. No. 758,061, Sept. 6, 1968, Pat. No. 3,550,985.

[52] U.S. Cl............274/4 A, 179/100.2 CA, 274/4 D, 310/51

[51] Int. Cl..........................G11b 21/08, G11b 15/44

[58] Field of Search..................310/51, 74; 226/168; 179/100.2 CA; 274/11 A, 4 A, 4 D, 11 D; 242/192

[56] References Cited

UNITED STATES PATENTS

| | | | |
|---|---|---|---|
| 3,487,175 | 12/1969 | Newell | 274/4 A |
| 3,419,686 | 12/1968 | Rhoades | 179/100.2 CA |
| 3,449,528 | 6/1969 | Camras | 274/4 A |
| 3,515,391 | 6/1970 | Nakamura | 274/4 A |
| 3,512,022 | 5/1970 | Gilbert | 310/51 |

FOREIGN PATENTS OR APPLICATIONS

| | | | |
|---|---|---|---|
| 400,957 | 11/1933 | Great Britain | 310/51 |

OTHER PUBLICATIONS

Haynes, Magnetic Tape Recording, 1952, pp. 183–195, 220, 221, 230, 231, 226,227.

*Primary Examiner*—Leonard Forman
*Assistant Examiner*—Dennis A. Dearing
*Attorney*—Marechal, Biebel, French & Bugg

[57] ABSTRACT

A transport for flexible tape employs a reversible rotatable capstan with supply and take-up rolls mounted on axes parallel to the axis of rotation of and movable toward and away from the capstan as tape is moved from one roll to the other. Whichever roll is functioning as a take-up is friction driven by the capstan. A synchronous motor drives the capstan and has a resonant damper to minimize velocity changes at running speed. When used as a multitrack longitudinal recorder, the transducer is quickly shifted to follow a different track as a tape direction change occurs when most of the tape is wound on one of the rolls.

1 Claim, 6 Drawing Figures

INVENTORS
DON C. BARNETT &
KINGSTON E. GANSKE
BY
Marechal, Biebel, French & Bugg
ATTORNEYS

REVERSIBLE TAPE TRANSPORT SYSTEM

CROSS REFERENCES TO RELATED APPLICATIONS

This application is a division of copending U. S. application Ser. No. 758,061 filed Sept. 6, 1968, U.S. Pat. No. 3,550,985 issued Dec. 29, 1970. The invention disclosed and claimed in this application is related to the disclosures of earlier applications Ser. No. 644,015, filed June 6, 1967 and now abandoned; Ser. No. 705,478, filed on Feb. 14, 1968, now U. S. Pat. No. 3,489,369; and Ser. No. 705,479, filed on Feb. 14, 1968, now U.S. Pat. No. 3,604,847 issued Sept. 14, 1971 all assigned to the same assignee as this application.

BACKGROUND OF THE INVENTION

This invention relates to reversible tape transport systems, particularly as used in magnetic recording. The particular form of transport system involved uses a reversible rotatable capstan driven by a synchronous motor and arranged to pass tape from one roll to another in either direction. The rolls are mounted to rotate about axes parallel to the rotational axis of the capstan, and these axes or hubs are mounted to move toward and away from the capstan as the tape is transferred from one roll to the other, thus changing the size of the rolls. Either roll operates as a supply or a take-up, depending upon the direction of operation. That roll functioning at any time as a take-up is friction driven by the capstan, while that roll functioning as a supply is held in somewhat spaced relationship from the capstan surface until it is time to reverse and the supply thus becomes the take-up.

It has been customary in other forms of transports to employ a rather large and heavy flywheel to assure a constant rotational velocity of the capstan. The inertia of such a flywheel is, however, basically incompatible with the requirements of a system for rapidly reversing the direction of tape movement. Without a flywheel, various servo controls have been suggested to assure a constant velocity, but such controls are complicated and expensive. It has been found that by employing a drive from a synchronous motor, using a resonant damper to minimize and velocity changes in the motor output, the desired constant tape speed can be achieved. This is important where one or more magnetic transducers cooperate with magnetic recording tape being moved by the capstan surface; particularly in video tape recording systems, absolute control over tape velocity is essential to eliminate time base errors.

To provided an effective longitudinal recording video tape recorder system, it is desirable to have multiple tracks usable from the tape, and to move the transducer head to scan different tracks on the tape in each direction. Thus, tape from the initial supply roll is transported past the transducer to take-up with the head scanning one track. As the end of the tape comes near, the capstan direction is rapidly reversed and the supply roll becomes the take-up, and during the rapid reversal the head is shifted to another track. This operation can be repeated a number of times. For example, in a successful embodiment of the invention tape is transported at a speed in the order of 120–160 inches per second in one direction, giving a recording time of about six minutes, then the tape direction is reversed and the head moved, to operate in the opposite direction for the same amount of time, and so on. It has been possible to accommodate all signals necessary for video recording and playback on a one-half inch wide tape using 10 dual tracks in this manner.

Accordingly, the primary object of the invention is to provide a novel reversible tape transport system which is capable of rapid turn around without losing control of the tape, and having a minimum of inertia beyond the unavoidable inertia of the roll of tape itself; to provide such a transport system wherein a tape direction is quickly reversed, and the transducer shifted, in the order of one second, to minimize disruption of viewing when the system is used in video recording; and to provide such a system which is relatively simple and economical in construction, operation and maintenance.

Other objects and advantages of the invention will be apparent from the following description, the accompanying drawings and the appended claims.

DESCRIPTION OF THE PREFERRED EMBODIMENT

Figures 1, 2:
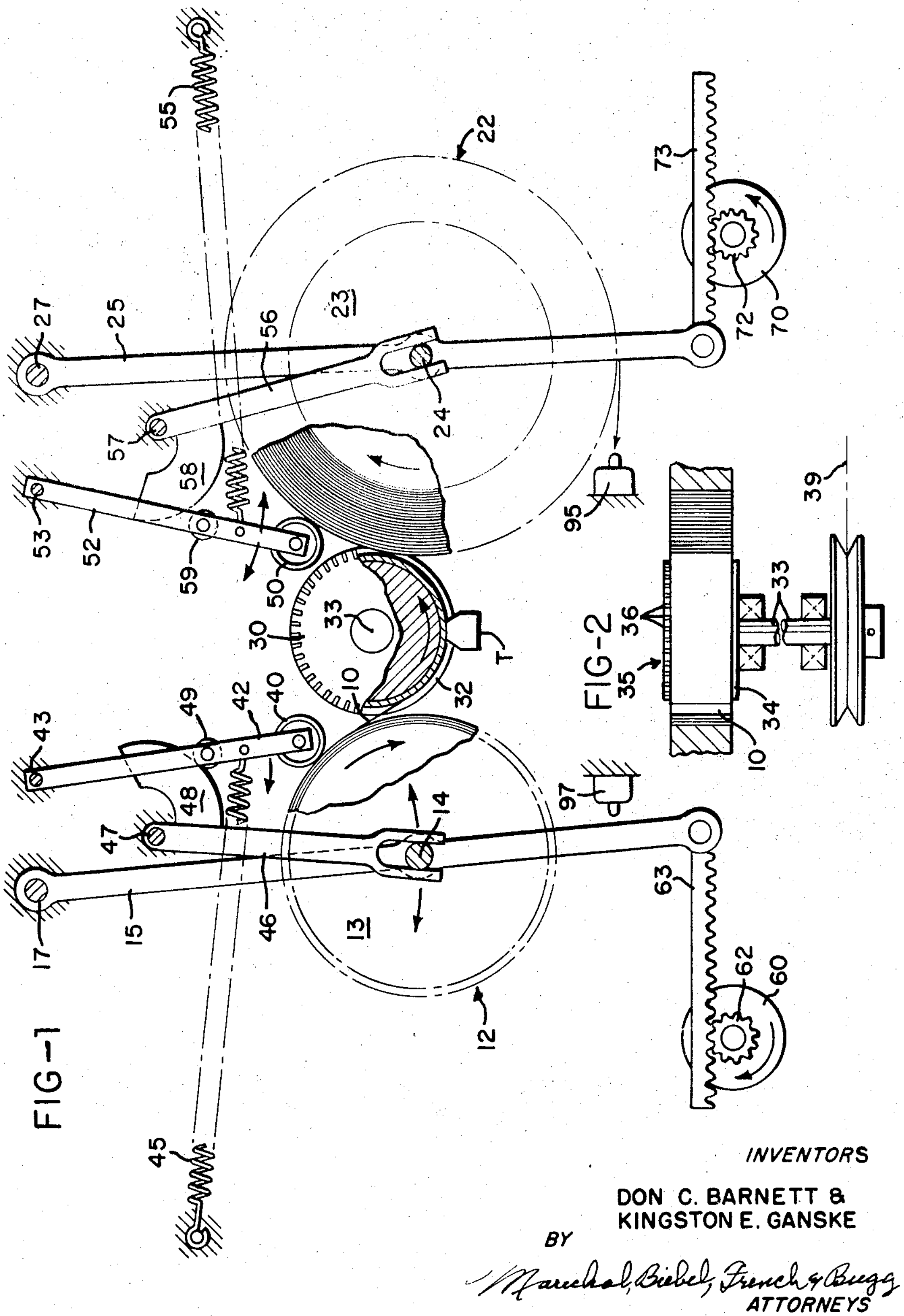
FIG. 1 is a somewhat schematic plan view of a tape transport system embodying features of the invention.
FIG. 2 is a view showing the capstan, its drive shaft, and fragments of the take-up and supply rolls.

Referring to the drawing, which discloses a preferred embodiment of the invention, the tape 10, which may for example be magnetic recording tape, is shown coming from a supply roll 12 which is wound on a hub 13 supported on a rotatable axle 14. This axle is in turn carried on a swinging arm 15 that is pivotally mounted at 17 to the deck or base of the transport. The tape 10 passes from the supply roll to a take-up roll 22 where it is supported and wound on a hub 23 having an axle 24 rotatably mounted on the supporting arm 25. This arm is also pivotally mounted on the base or deck through the pivot hinge or pin 27.

Suitable one-way acting brakes (not shown) may be provided for the axles 14 and 24, to resist unwinding of the tape from the associated hub with a limited force. When the hub is rotated in the opposite direction the brake has no effect.

The tape is passed around the driving capstan 30 which has a resilient peripheral face 32, such as a rubber "tire", which engages the back surface of the tape and moves it from one roll to the other. The capstan is mounted on a drive shaft 33 which supports and rotates the capstan. The capstan incorporates a lower fixed or rigid guide flange 34 and an upper flange 35 which preferably is formed of somewhat flexible material and is sectioned adjacent its outer edge, as by a number of slots, into a plurality of spring sections 36 which tend to guide the upper edges of the tape downwardly, thus guiding the lower edge of the tape in to contact with the flange 34. This arrangement assures proper alignment of the tape, as when passing it across one or more magnetic transducers T that are mounted to contact the tape at one side of the capstan, and also contributes to accurate placement of the tape on the take-up in the type of configuration shown.

The capstan is driven by a synchronous motor 38 through a drive connection such as the belt and pulley drive 39 which is shown schematically in FIG. 2. In the two-way configuration shown, this motor is reversible.

In accordance with the invention a means is provided for holding the departure point of the supply roll 12 at a predetermined and constant spaced relation to the capstan, thereby causing the tape 10 to span a gap from its point to departure from the supply roll to its point of initial engagement with the peripheral face of the capstan. This spacing need not be very large, and in practice a spacing of about 0.010 inch has been found adequate. For this purpose a roller 40 is mounted for free rotation on the end of an arm 42 that is in turn pivotally mounted at 43 to the deck. A medium force spring 45 is connected between a fixed point on the deck and the arm 42, and tends to pull the roller 40 into engagement with the supply roll, and thus push the roll away from the capstan, in the direction shown by the arrow in FIG. 1.

The movement of arm 42 and roller 40 is controlled through a following arm 46, which is pivoted to the base at 47, and which has a forked end engaged around the axle 14, or some other suitable point on the supply roll. The arm 46 carries a control cam 48 which engages a roller follower 49 on the arm 42. The cam is contoured according to the decrease in diameter of the roll 12 as successive convolutions of the tape are removed. The arm 46 and cam 48 thus function as a following and position control means which maintains the roller 40 engaging the outermost convolution of the tape on the supply roll, and holds this roll at an essentially constant spacing from the peripheral resilient face of the capstan.

Since the transport system preferably is intended to be bi-directional, the invention preferably includes a comparable control for the roll 22, since in the reverse direction of operation from that shown, it will in fact function as the supply roll. Thus, there is a second roller 50 carried on the end of an arm 52 which is pivotally mounted to the base at 53. The roller 50 rides in contact with the outermost convolution of tape on the roll 22, and is urged against the roll by the force of spring 55 connected between arm 52 and a fixed point on the base. A following arm 56 is pivoted to the base at 57 and carries a further control cam 58 which engages a roller follower 59 on arm 52.

This system tends of course to move the take-up roll 22 away from the capstan, however in the type of system shown it is desired that there by pressure contact between the capstan and this roll in order to assure that the tape is placed smoothly and evenly on the take-up. Further, this contact may be used to rotate the take-up. Therefore, means are provided to override the force and effect of the rollers 40 and 50, respectively, depending upon which side is functioning as the take-up.

A torque motor 60 having an output pinion or gear 62 is connected to drive a rack 63, which is in turn connected to an extension of the supply roll mounting arm 15. Similarly, a torque motor 70 has a pinion 72 meshing with a control rack 73 that is pivotally connected to an extension of mounting arm 25. Depending upon the desired direction of rotation, one or the other of these torque motors is actuated to exert sufficient force to overcome the force of the corresponding spring, roller and connected mechanism, and to urge the roll in to pressure contact with the capstan. In the condition shown torque motor 70 is thus energized and produces pressure contact between the take-up roll 22 and the capstan. Torque motor 60 at this time exerts no effective force on the system. However, in reverse direction operation, torque motor 60 overrides the roller 40 and its associated mechanism, while torque motor 70 becomes ineffective and the roller 50 maintains the desired constant spacing between the tape departure point of roll 22 and the capstan surface.

Figures 3, 4, 5:
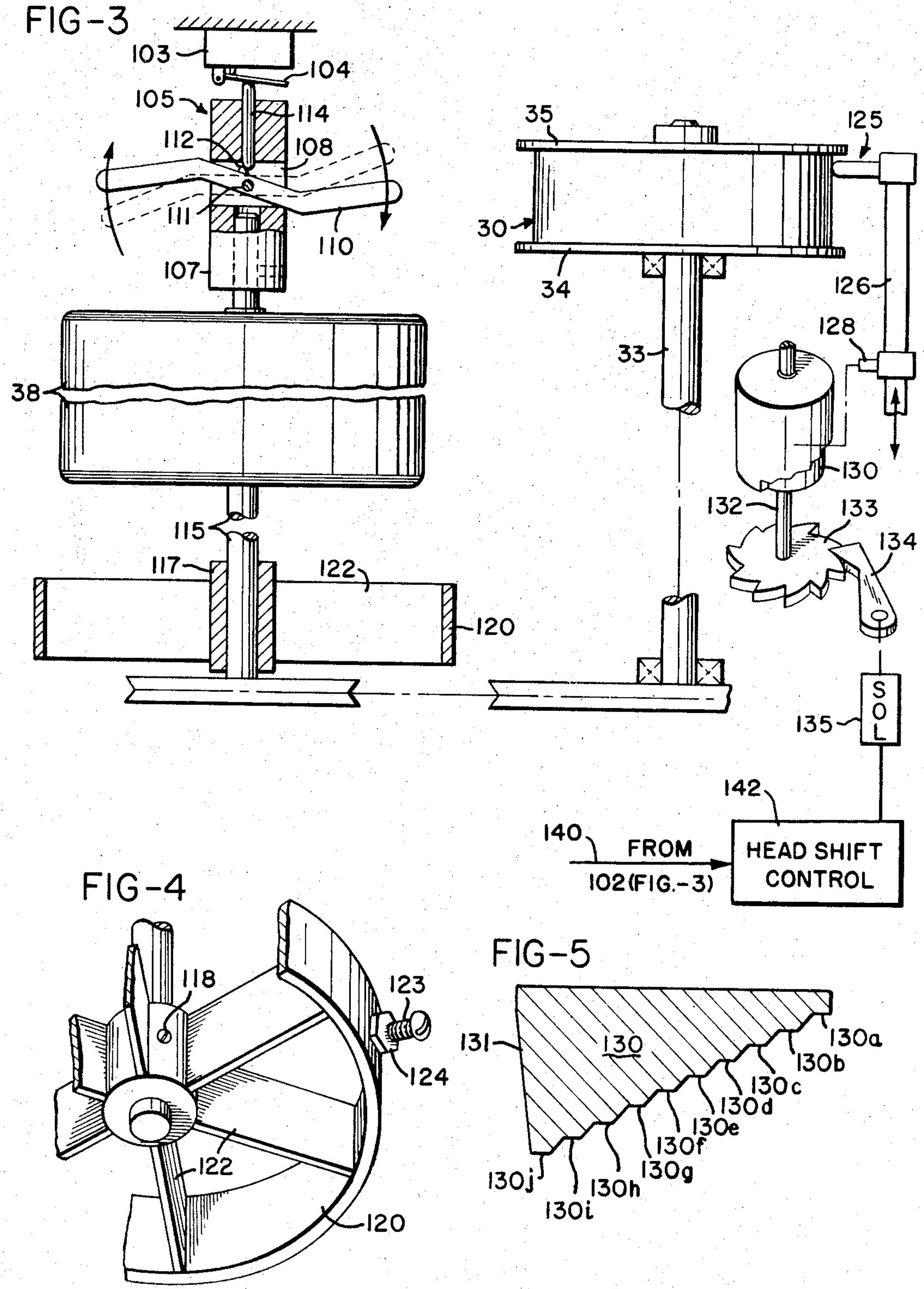
FIG. 3 is a somewhat schematic view showing the capstan, its synchronous motor drive including the resonant damper and speed control switch, and mechanism for shifting the transducer to different tracks.
FIG. 4 is a partial perspective view showing details of the resonant damper.
FIG. 5 is a diagram of the constant controlling movement of the transducer head.

FIG. 3 is a diagram of a suitable control for the system, shown for simplicity as an A.C. control circuit. Power supply is indicated by the + legend, and the opposite terminals are shown grounded. A manually operated start switch 80 (shown open) is connected to one element **82*a* of a three pole double throw manual stop switch 82 (shown in normal or start position). The start switch also provides power when closed to the coil of a time delay relay 83. The blade 83*a* of this relay completes a power supply circuit directly to a second blade element 82*b* of the stop switch, and this in turn applies power to the motor power line 84**.

The third element **82*c* of the stop switch is connected to power supply through the relay blade or contact 83*a* and thus is controlled by it. In the normal position of the stop switch, the element 82*a* provides power (with the start switch closed) to a line 85 which forms a higher voltage supply to one or the other of the torque motors 60 and 70. Also, line 85 is arranged to receive power through the normally open contact of stop switch element 82*b* in the closed position of the stop switch, provided relay 83** is energized.

A dropping resistor 86 is connected from line 85 to a lower voltage supply line 88. This line can also become a higher voltage supply via its connection through the normally open contact of stop switch element **82*c*, also provided relay 83** is energized.

A direction control latching relay 90 has four double pole contacts which control the reversing circuits for motor 38, and for the torque motors. Relay blades **90*a* and 90*b* are arranged to reverse the polarity of one of the motor windings, through capacitor 91. Relay blades 90*c* and 90*d* control the power supply to torque motors 70 and 60, respectively, from either the high voltage line 85 or the normally low voltage line 88. In the condition shown, motor 70 is connected to the higher voltage and thus holds take-up roll 22 against the capstan, and motor 38 is rotating the capstan 30 counterclockwise, as viewed in FIG. 1**.

To reverse, the coil 90L of the latching relay is energized, either through the manual reversing switch 94, or the automatically controlled switch 95 (see also FIG. 1) which senses movement of arm 15 corresponding to an empty supply roll 12 Changing direction back to that shown is accomplished by energized coil 90R of the latching relay, either through manual switch 96 or the automatic switch 97 which is closed by arm 25 when it reaches a position corresponding to an empty roll 22.

On stopping the system, moving stop switch 82 to its stop position, opposite to that shown, switch element 82b maintains power to the higher voltage line 85 through its normally open contact, and line 88 is changed to the higher voltage through the normally open contact of element 82c. Both torque motors thus receive higher voltage and hold both roll 12 and 22 against the capstan. This prevents overrunning of the supply roll as the system decelerates.

The start and stop switches are mechanically interlocked by conventional means (not shown), such that actuating one moves the other to the opposite position. Thus start switch 80 will open when stop switch 82 is closed. This interrupts the power supply to the coil of the time delay relay. However a time delay device (not shown) holds the relay blade 83a closed for a certain period of time, sufficient to permit the system to stop before blade 83a opens and interrupts the power supply to motor 38 and torque motors 60 and 70. After the transport is stopped, both rollers 40 and 50 are free to move their associated rolls 12 and 22 away from the capstan, relieving its surface 32 from pressure contact with either roll.

During normal operation of the motor 38 at its synchronous speed the capstan is rotated at a corresponding predetermined speed which produces the desired constant velocity of the tape past the transducers T. In order to operate at a speed significantly lower than synchronous speed, such as in a recording device which provides for self-threading, the present invention provides a separate power and speed control for the synchronous motor.

The electrical power supply is connected through a normal running circuit including line 84 and the speed selector means 100. This means may be in the form of a double pole single throw mechanical switch as illustrated, or may be in the form of any suitable electronic or electrical switching device as may be desired.

The slow speed power circuit to the motor is connected by actuating the selector means 100 to complete a circuit through line 102 and an interrupter means 103 which is controlled by a feedback device responsive to the motor speed. The interrupter 103 conveniently is in the form of a normally closed switch which has an internal spring load tending to hold it in its closed position. The actuator arm or leaf 104 of this switch extends into contact with a governor mechanism 105, details of which are shown in FIG. 3.

The rotor shaft of the motor 38 has fastened to it a spindle 107 which is provided with a cross passage 108 receiving the fly-weight arm 110, and this arm is pivotally mounted about a transverse axis through a crosspin 111. A cam 112 is formed on the arm 110 slightly to one side of the crosspin, and this cam engages an actuator pin or rod 114. The pin 114 is slidably mounted in the hub 107 along its axis of rotation and extends upward into engagement with the switch actuator arm 104.

The internal spring load of the switch 103 normally is sufficient to push pin 114 downward against cam 112, thus at rest and at speeds below the desired low speed motor operation, the fly-weight arm 110 is urged to the position shown in dotted lines in FIG. 3. The positions of the pin and cam are shown in the "at rest" position in full lines.

As the motor reaches a predetermined speed at which the fly-weight 110 will rotate about its crosspin, the fly-weight will move to the position shown in full lines in FIG. 3, since the ends of the fly-weight arm will tend to assume the largest radius that they can attain. This causes cam 112 to push upward on the pin 114, opening the switch 103 and thus interrupting the low speed power supply to the motor. As the motor slows, for example due to the load upon it, the fly-weight arm will return to its dotted line position, and switch 103 will again close. By appropriate selection of the length and mass of the fly-weight arm, it is possible to have the fly-weight move between these tow positions over a relatively small range of speed difference. This permits the interrupter in the low speed circuit to open and close again at speeds which are fairly close to each other, for example in the order of 20 r.p.m. difference, thus it is possible to operate the synchronous motor at this lower speed, which is essentially the actuating speed of the fly-weight arm 110, without noticeable hunting.

FIG. 3 shows the precision motor drive system incorporating the synchronous motor 38 receiving power from a suitable AC supply. This supply is usually 60 cycle AC, although it should be recognized that in some locations either 25 cycle or 50 cycle AC is used commercially. The motor shaft 115 is connected to the pulley, and it is this shaft which has been found to exhibit a vibratory output torque variation which is related to the frequency of the AC supply. For example, with a 60 cycle AC power supply the output torque variation has been observed at 120 cycles per second, generally according to the regularly changing polarity of the alternating current power input.

In accordance with the invention a resonant damping device is provided on shaft 115 in the form of a hub member 117 fixed to the shaft, for example by tightening a set screw 118. Surrounding this shaft, coaxial with the hub, is a ring 120 which is connected to the hub 117 by a plurality of compliant spoke members 122. These spoke members are fastened at opposite ends to the hub and to the ring respectively, and are preferably selected from flat strips of spring steel having sufficient resilience to cause the hub-spoke ring system to exhibit a resonant vibration characteristic at a frequency of approximately double the frequency of the AC power supply, for example 120 cycles per second. It has been found desirable to incorporate the shaft 115 as a part of the resonant damping device, by accurately tuning the damping mechanism while attached to the shaft 115. Since it is desirable to have the damping device tuned as closely as possible to the desired resonant frequency, it may be desirable to include some means for fine tuning of the resonant frequency of the system, and satisfactory results have been obtained by providing a plurality of threaded screws 123 which are received in threaded holes at regularly spaced intervals (usually 120 degrees apart) on the ring 120.

Lock nuts 124 are provided to hold each screw in its adjusted position. By turning the screws it is possible to move their respective weights toward or away from the axis of rotation of the device, and hence to change the moment of inertia of the ring 120 by a slight amount sufficient to provide the desired accurate tuning.

The transducers T are carried in a head 125 mounted on a supporting post 126 for movement transversely of the path of movement of the tape 10 which is carried past the head on capstan 30. A track width is a relatively small fraction of the total width of the tape, for example in a typical embodiment the tape 10 has a width of one-half inch, and each track width is 0.017 inch. Thus, the track or tracks followed by the head occupy relatively small and spaced apart segments of the width of the tape, and the head 125 can be moved to different positions with respect to the tape in order to follow different tracks as the tape is transported in one direction or the other between the supply and take-up.

For purposes of moving the heads simultaneously, a selector device is provided in the form of the supporting rod or post 126 cooperating with a cam follower 128, and the post is mounted for vertical movement, for example in a suitable tubular holder or the like (not shown). A light spring is adapted to press upward against the post 126 urging it to its upper limit position.

The cam follower 128 engages a barrel type cam 130 which is mounted adjacent the post 126, being secured to a rotatable shaft 132 which has fixed to it a ratchet wheel 133. The pawl 134, which may be controlled for example by a solenoid 135, is arranged to rotate the ratchet wheel and hence the cam 130, by a predetermined angular amount. Preferably a conventional secondary pawl (not shown) is provided to hold the ratchet wheel in any given position.

FIG. 5 is a graphic view of the control surface of cam 130, illustrating ten steps **130*a*–130*j*, any one of which may be engaged with the follower 128 to locate the post and the heads in a corresponding vertical position. As will be obvious from FIG. 3, a counter-clockwise rotation of cam 130, as view from above, will provide a cam action of the follower 128 tending to push it downward in a step-by-step fashion. After the final or lowermost step, there is a return and a ramp 131 which will guide the follower back to its upper most position 130*a*** in response to urging of the spring.

Figure 6:
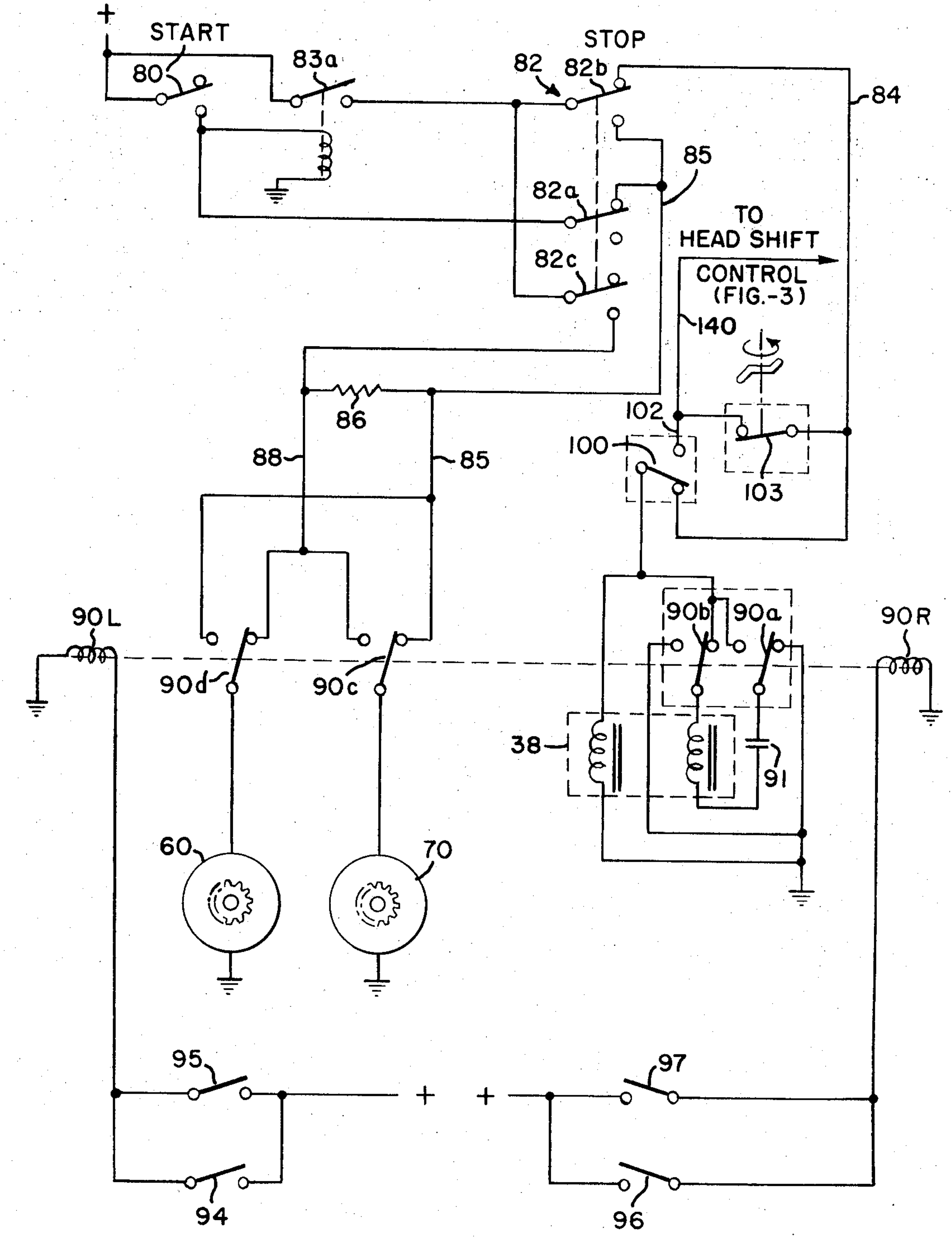
FIG. 6 is a schematic wiring diagram.

As shown in FIGS. 3 and 6, when the fly-weight operated switch 103 is closed, selector 100 is in the position shown, and the transport is operating, a signal appears on line 102, and this signal indicates slowing of the motor-capstan assembly. This signal is applied through line 140 to the head shifting control unit 142, which in turn is connected to actuate the solenoid 135. As the motor and capstan decelerate in a reversing operation, the head shift control thus receives a signal as the capstan is almost stopped. Due to inherent delays in the head shifting controls and mechanism, this causes the head 125 to be moved to a different track immediately as the motor and capstan reverse.

Since actuation of switches 95 or 97 will immediately energize the appropriate coil 90L or 90R of the latching relay, the relay blades **90*c* and 90*d* will shift to place a higher voltage on whichever torque motor 60 or 70 was previously energized through the lower voltage line 88**. The roll functioning as a supply thus is immediately moved into contact with the capstan as it decelerates, preventing the supply from overrunning. The roll acting as a take-up will begin to move away from the capstan, as its torque motor now is connected to the lower voltage supply. However, the take-up has been driven by the capstan up to that time, hence its inertia will keep the tape taut as it leaves the slowing capstan.

The motor 38 decelerates rapidly, since reversing polarity of one of the windings effectively causes a dynamic braking of the motor and the rotating parts have a relatively low mass. The motor quickly reaches zero velocity and starts accelerating in the opposite direction. Due to the low inertia of the system, this change in direction is rapid, only a fraction of a second being required to change from full speed in one direction to the other. In this time the head is shifted to another track, hence there is only a short interruption in the output (or input) signals from the tape. The head remains following the previous track during deceleration, thus recording or reading of a signal from that rack continues up to the moment of reversal. By the time the head is then shifted, the tape is accelerating in the opposite direction and recording or reading resumes immediately on the next track, with a minimum of interruption, and without reading or recording over the same track in opposite directions. This is a particular advantage in longitudinal recording or programs such as video signals, where minimum interruption is desired.

While the form of apparatus herein described constitutes a preferred embodiment of the invention, it is to be understood that the invention is not limited to this precise form of apparatus, and that changes may be made therein without departing from the scope of the invention.

What is claimed is:

1. In a transport system for recording tape, comprising a pair of rolls providing a supply and a take-up for flexible recording tape, a head and at least one transducer mounted therein to scan a track along said tape which track has a width which is only a fraction of the tape width, means supporting said head for selective movement to different positions across the width of said tape, a selector device controlling the position of said supporting means, a rotatable capstan arranged to engage the tape over a section of its peripheral face and to drive the tape from one of said rolls to the other, a reversible A. C. drive motor having an output shaft coupled to rotate said capstan, speed sensing switch means driven by said motor, an operating connection between said switch means and said selector drive to provide a signal in response to slowing of said motor to a sufficient degree for changing of said head to a different track location, the improvement comprising resonant damping means coupled to said output shaft and constructed and arranged to minimize rotational velocity changes thereof at normal motor speed, said damping means including a low inertia ring and flexible supports connecting said ring to said shaft, said damping means being tuned to a frequency of twice the A. C. supply to said motor, control circuits connected to reverse said motor rapidly when an end of the tape is near to said head and while some tape is wrapped about each of said rolls, and a connection from said reversing control circuits to said selector device providing for actuation thereof when said motor is reversed to locate said transducer on a different track as the tape reverses direction.

* * * * *